O. JOHNSON.
LOCOMOTIVE ENGINEER'S SEAT.
APPLICATION FILED NOV. 28, 1921.
1,423,855.
Patented July 25, 1922.
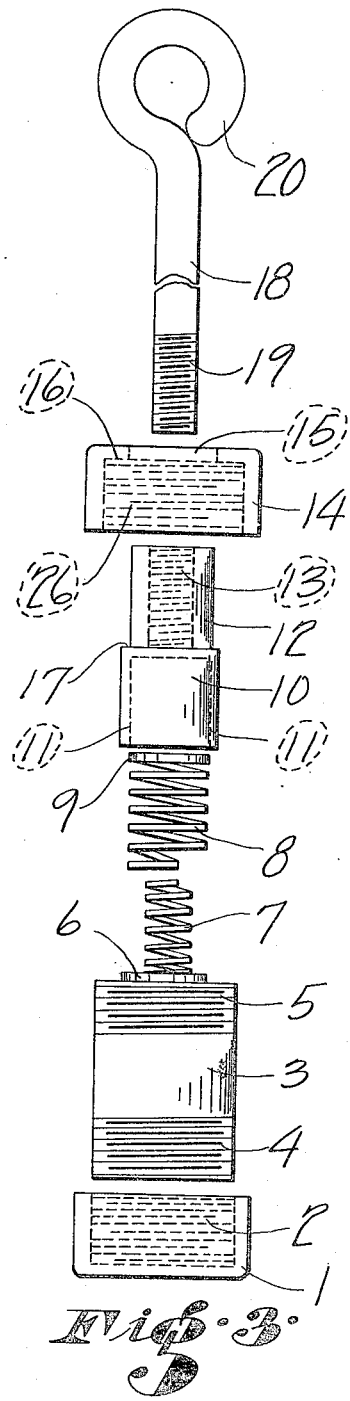
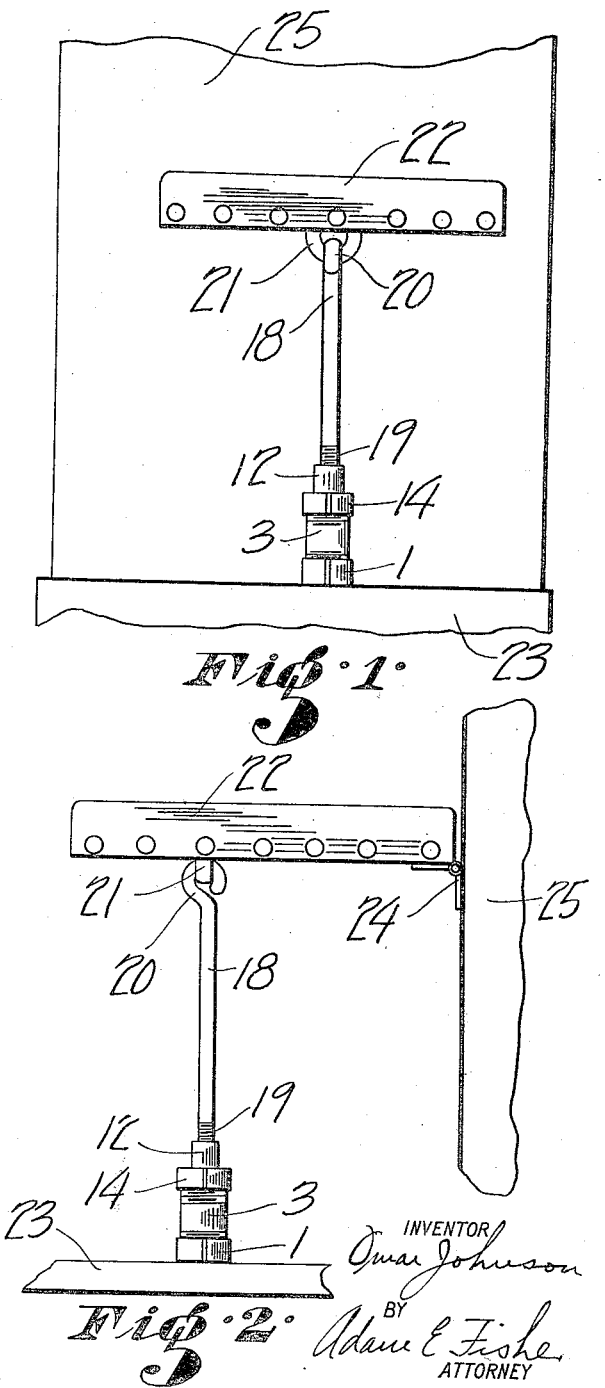
INVENTOR
Omar Johnson
BY
Adam E. Fisher
ATTORNEY

UNITED STATES PATENT OFFICE.

OMAR JOHNSON, OF LARAMIE, WYOMING.

LOCOMOTIVE ENGINEER'S SEAT.

1,423,855.  Specification of Letters Patent.  Patented July 25, 1922.

Application filed November 28, 1921. Serial No. 518,420.

*To all whom it may concern:*

Be it known that I, OMAR JOHNSON, a citizen of the United States, residing in the city of Laramie, State of Wyoming, have invented new and useful Improvements in Locomotive Engineers' Seats, of which the following is a specification, reference being had to the accompanying drawings.

This invention is a seat for locomotives, and the object is to provide a relatively simple and practicable seat of this kind, embodying a resilient element for relieving the engineer of the inconvenience and discomfort attendant upon the use of the ordinary and relatively rigid seat.

In the drawings:

Figure 1 is a front view of the improved seat as mounted in a locomotive cab.

Figure 2 is an end view.

Figure 3 is a detail of the several elements of the seat post in expanded relation.

The invention consists of a base cap 1 screw threaded inside as shown at 2 to receive the pipe nipple 3 which is screw threaded at each end as shown at 4 and 5, the lower end 4 being adapted to screw down into the cap 1 as stated. A disk 6 is adapted to seat inside the cap 1 and two springs 7 and 8 are seated upon this disk, the spring 7 nesting inside the spring 8, and the latter being of a size to readily be compressed inside the pipe nipple 3. Another disk 9 is mounted at the upper end of the springs. A tubular plunger 10 slidingly passes within the pipe nipple 3 as the springs 7 and 8 are compressed, the upper ends of these springs passing inside the tubular portion 11 of the plunger 10. The plunger 10 is provided with a reduced tubular shank 12 which is threaded inside as shown at 13. A top cap 14 sets over the shank 12, the cap having a hole 15 through which the shank passes, while the flange 16 of the cap rests upon the shoulder 17 of the plunger 10. This cap is threaded inside as shown at 26 to engage the upper end of the pipe nipple 3. An eye bolt 18 is threaded at 19 to engage the threads 13 of the shank 12. The eye 20 is in turn secured to a staple 21 at the under side of the seat 22. and the base cap 1 rests upon the seat base 23. The seat 22 is hinged at 24 to the side of the cab 25. With the elements described so assembled, and with the springs 7 and 8 compressed within the pipe nipple 3, and the caps 1 and 14 screwed onto the nipple 3, a resilient buffer is afforded as a support for the seat 22, doing away with the jarring and bumping effect of the ordinary seat.

While I have herein described a certain specific method of constructing and assembling the elements of my invention, it is understood that same may be varied in minor details, not departing from the spirit of the invention as defined in the appended claim.

I claim:

A seat for locomotive engineers, comprising a seat base, a seat hinged above the base to one side of the locomotive cab; and a resilient element mounted between the seat and seat base, said element consisting of an interiorly threaded base cap to rest inverted upon the seat base; a pipe nipple exteriorly threaded at each end, one end being adapted to engage the base cap, two nested coil springs adapted to compress within the pipe nipple, a plunger to seat upon the springs compressed in the pipe nipple, the lower end thereof being tubular to receive the upper ends of the springs and the upper end being a reduced tubular shank threaded interiorly, a top cap for setting over the shank of the plunger, same having a hole through which the shank passes and being threaded interiorly to engage the upper end of the pipe nipple, and an eye bolt to engage the plunger shank, the eye of the bolt being secured to the under side of the seat.

OMAR JOHNSON.

Witnesses:
 A. M. SPALDING,
 E. E. FITCH.